April 26, 1955  R. R. BLOSS ET AL  2,707,093
DISC TYPE ROLLER KELLY DRIVE
Filed Oct. 1, 1951  3 Sheets-Sheet 1
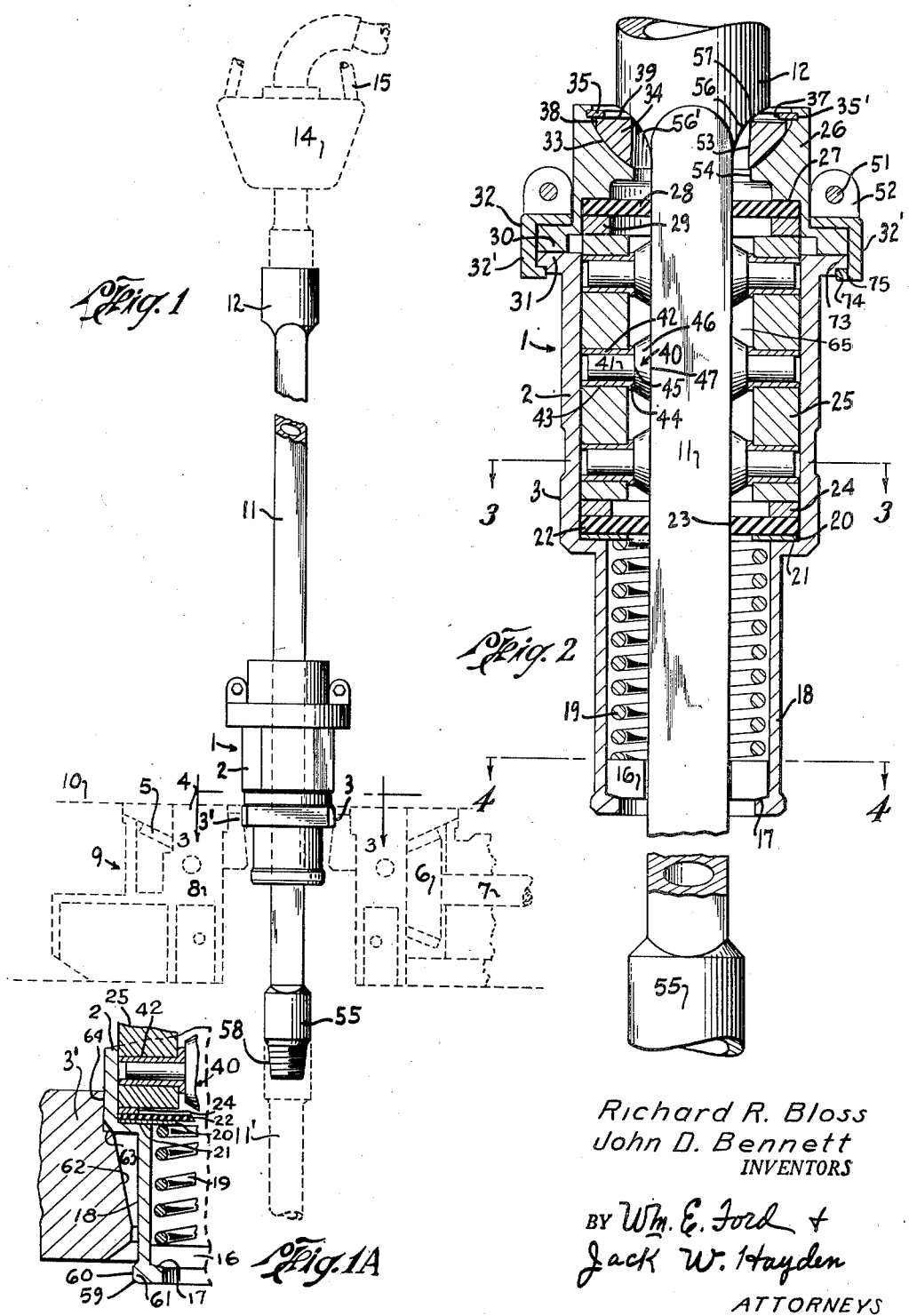
Richard R. Bloss
John D. Bennett
INVENTORS
BY Wm. E. Ford &
Jack W. Hayden
ATTORNEYS April 26, 1955　　　R. R. BLOSS ET AL　　　2,707,093
DISC TYPE ROLLER KELLY DRIVE
Filed Oct. 1, 1951　　　　　　　3 Sheets-Sheet 2
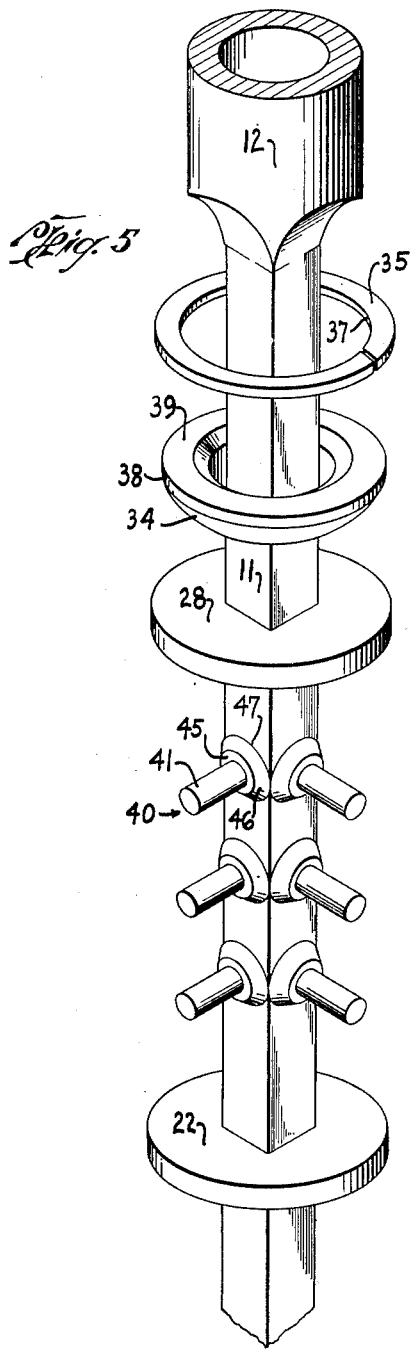
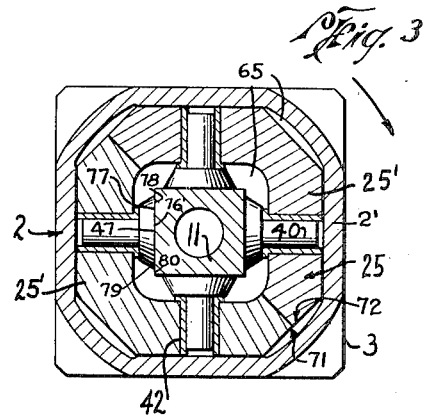
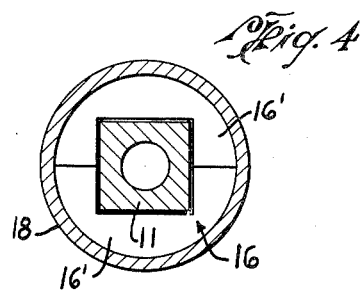
Richard R. Bloss
John D. Bennett
INVENTORS
BY Wm. E. Ford +
Jack W. Hayden
ATTORNEYS April 26, 1955
R. R. BLOSS ET AL
2,707,093
DISC TYPE ROLLER KELLY DRIVE
Filed Oct. 1, 1951
3 Sheets-Sheet 3
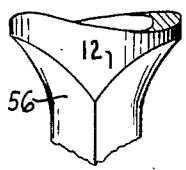
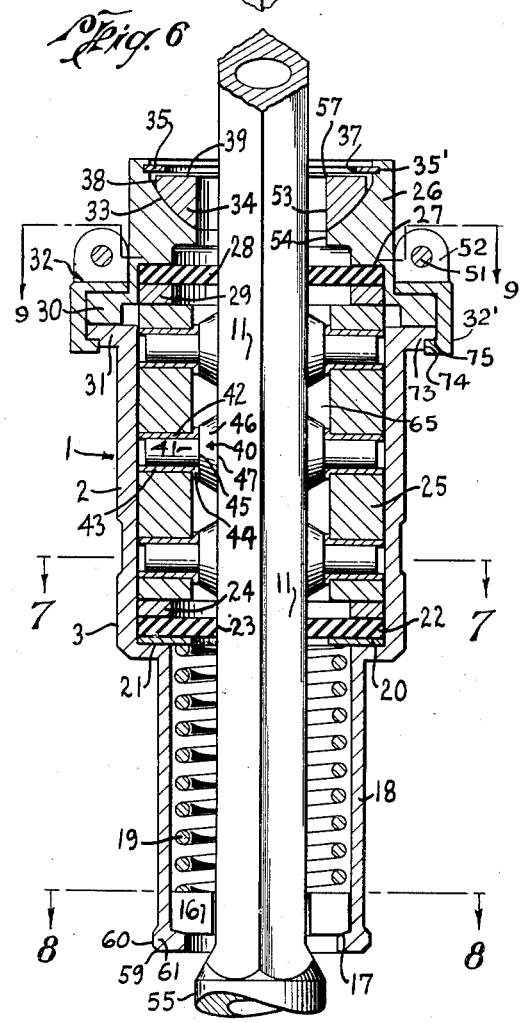
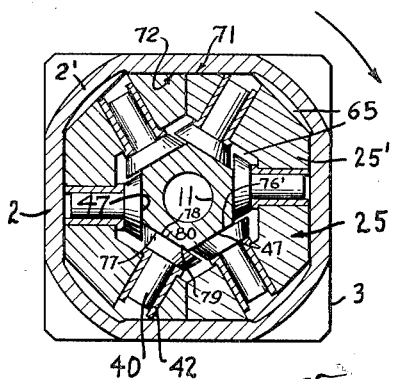
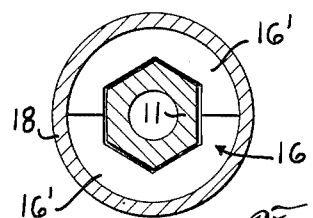
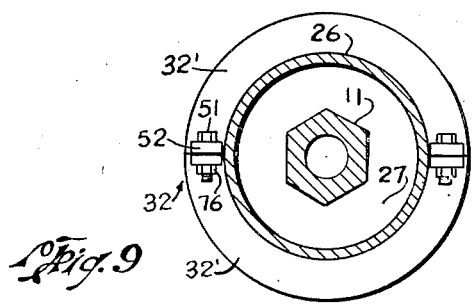
Richard R. Bloss
John D. Bennett
INVENTORS
BY Wm. E. Ford +
Jack W. Hayden
ATTORNEYS

United States Patent Office 2,707,093
Patented Apr. 26, 1955

2,707,093

DISC TYPE ROLLER KELLY DRIVE

Richard R. Bloss and John D. Bennett, Beaumont, Tex., assignors to Dresser Equipment Company, Beaumont, Tex., a corporation of Ohio Application October 1, 1951, Serial No. 249,191

27 Claims. (Cl. 255—23)

This invention relates to an improved type Kelly drive specially constructed to resist the tendency of a weight loaded kelly having an irregularly tapered head to bend when the head rests upon the Kelly drive; specially constructed to provide in a sealed oil bath a plurality of rollers to contact each polyhedral surface of the kelly with area surface contact in planes extending radially of the roller axes; and specially constructed to resiliently resist the lifting of the Kelly drive by the Kelly lower end or tool joint by protecting the Kelly drive housing and the lower wiper or seal within the Kelly drive housing, from damaging contact with the Kelly tool joint.

It is therefore an object of this invention to provide a ball and socket joint at the top of the Kelly drive housing with a hole through the ball member to admit the passage therethrough of the Kelly tool joint but not large enough to admit the passage therethrough of the Kelly head, with the result that an unevenly or irregularly tapered head may be supported by the ball member so that the loaded kelly may be supported substantially concentrically with the vertical axis of the Kelly drive and rotary bushing.

It is also an object of this invention to provide an improved Kelly drive which has rollers in a sealed oil bath therein to furnish a plurality of contact surface areas with each polyhedral surface of the kelly with the planes of such surfaces extending radially of the roller axes.

It is another object of this invention to provide an improved Kelly drive which has a split collar in the pilot tube of the Kelly drive, and which has a spring constrained above the split collar and below the rollers in the sealed oil bath thereabove to resiliently resist the lifting of the lower end or tool joint of the kelly against the split collar, thereby protecting the Kelly drive housing at the base of the Kelly drive pilot tube and also the lower seal or wiper of the oil bath from harmful contact with the Kelly tool joint.

Other and further objects will be apparent when the specification is considered in connection with the drawings in which:

Fig. 1 is an elevation of a square cross-sectioned kelly installed in a Kelly drive with drilling rig elements related therewith shown dotted;

Fig. 1-A is an enlarged fragmentary sectional elevation showing the structure of the Kelly drive housing and of the bushing which adapts it to fit in the rotary table of the rotary machine which rotates the Kelly drive and the kelly;

Fig. 2 is an enlarged sectional elevation through one modification of Kelly drive showing the kelly in place to be supported by the Kelly drive;

Fig. 3 is a sectional plan view taken along line 3—3 of Figs. 1 and 2;

Fig. 4 is a sectional plan view taken along line 4—4 of Fig. 2;

Fig. 5 is a perspective development showing the kelly and the novel parts of the Kelly drive associated therewith;

Fig. 6 is an enlarged sectional view through another modification of Kelly drive showing a kelly of hexagonal cross-section before it has been lowered to be supported by the Kelly drive;

Fig. 7 is a sectional plan view taken along line 7—7 of Fig. 6;

Fig. 8 is a sectional plan view taken along line 8—8 of Fig. 6.

Fig. 9 is a sectional plan view taken along line 9—9 of Fig. 6.

The body 2 of the housing 1 has a bushing or polyhedral portion 3 which is adapted to be received in a corresponding polyhedral portion or bushing 3' of the rotary table 4 shown in dotted lines in Fig. 1. This table 4 has the gear 5 rigidly connected thereto and is driven by the pinion 6 on the drive shaft 7. Such shaft is supported in the frame 8 of the rotary machine 9 which is installed in the derrick floor 10.

The kelly 11 has its head 12 connected, as to the swivel 14 which is in turn supported by its bails 15, which are suspended from the traveling block of the drilling rig, not shown. With the body 2 supported as described hereinabove, the kelly is lowered therethrough as drilling progresses at the bottom of the well bore, while at the same time the Kelly drive rotates with the rotary table and rotates the kelly 11 and drill stem 11' as will be hereinbelow described.

When the Kelly drive is assembled, the split collar 16 rests on the shoulder 17 at the base of the pilot tube 18 and supports the spring 19 thereabove. The hold down ring 20 rests upon the shoulder 21 within the housing body 2, and the wiper or sealing member 22 rests thereon and has the central hole 23 therethrough to maintain a sealing and wiping contact with the kelly 11. The spacer ring 24 rests upon the wiper 22 and the roller support assembly 25 rests upon the spacer ring 24.

The roller support assembly 25 is split, as shown in the sectional plan views of Figs. 3 and 7, to comprise two complementary sections 25', extending from the supporting spacer ring 24 to their top surfaces slightly above the top flange 31 of the body 2, as shown in Figs. 2 and 6. Such sections 25' combine to provide outer surfaces 71 of polyhedral cross-section, as shown in Figs. 3 and 7, to fit snugly within the inner polyhedral surfaces 72 of the bushing portion 2' of the body 2, and for the vertical extent shown in Figs. 2 and 6.

The housing cap 26 has the inner shoulder 27 therein so that the upper wiper or sealing member 28 may fit thereagainst, while the spacer or shim ring 29 lies between the upper wiper and the top surfaces of the roller support assembly 25. The flange 30 of the cap 26 rests upon the flange 31 of the housing body and the split locking or connection ring assembly 32 is employed to connect the housing cap 26 and body 2 and to thus complete the assembly of the housing 1.

The construction of the locking ring assembly 32 can best be seen by considering Fig. 9 in connection with Fig. 6. The ring sections 32' of the ring assembly 32 are complementary and together provide an annular lip 73 which bears at 74 and 75 against peripheral and annular undersurfaces, respectively, of the top flange 31 of the body 2. Thus when the nuts 76 on the bolts 51, as shown in Fig. 9, are tightened, the opposed ears 52 of the complementary ring sections 32' are drawn together, and the locking ring assembly 32 is assembled to lock the cap 30 to the body 2, against either sideward or axial displacement.

The cap 26 provides a dished surface 33 in which may seat the ball segment or member 34. The hold down ring 35, having an inner diameter 37 which is smaller than the outer diameter 38 of the ball member, is assembled in the annular groove 35' in the cap member. This groove is spaced above the dished surface 33 and above the upper surface 39 of the ball member when the ball member 34 is seated in the cap 26 so that its upper surface 39 normally extends horizontally.

The rollers 40 are vertically spaced apart in the support sections 25' with axes in substantially the same vertical plane and extending substantially horizontally and consequently radially or transversely of the Kelly axis. Each roller has a shaft or shank 41 which fits within a bushing 42 in a bore 43 in a complementary section 25'. The bushing 42 has the flange 44 thereon against which bears the truncated face 45 of the roller member 46 which is the shape of a truncated cone. The base face 47 of each roller member can be seen to be of substantial contact surface area and provides such surface to extend radially of the roller axis and consequently, as shown in Figs. 2, 5, and 6, the rollers can have both rolling and sliding contact with each polyhedral surface of the kelly and over a substantial area thereof.

In Figs. 3 and 7, the directional arrow indicates the direction of rotation of the rotary table 4 shown in Fig. 1-A. As the body 2 has the polyhedral surfaces 3 to fit within and against the inner polyhedral or bushing surfaces 3' of the rotary table 4, the body 2 rotates with the rotary table. Then since the outer polyhedral surfaces 71 of the roller support sections 25' bear within and against the inner polyhedral surfaces 72 of the bushing portion 2' of the body 2, it follows that the roller support assembly 25 rotates with the body 2 and rotary table 4. In turn, the rollers 40 are supported by the roller support assembly 25 to bear against the outer polyhedral surfaces 76' of the kelly 11, so that the kelly 11 must rotate with the roller support assembly 25, the body 2, and the rotary table 4.

It can thus be seen that that part 77 of each roller surface 47 which is in the direction of rotation will bear heavily against the Kelly surface portion 78 in contact therewith. On the other hand, that part of each roller surface 47 which is away from the direction of rotation will bear lightly against or even slightly clear the adjacent opposed surface portion 80 of the Kelly surface 76'. This obviously results in the setting up of couples of thrust or force operative between the roller surfaces 47 and the Kelly surfaces 76', to cause the rollers 40 to rotate.

As shown in Figs. 3 and 7, the roller support assemblies 25 are comprised of two sections 25' since these have to be fitted into the housing body 2 after the kelly extends therethrough. As shown in Figs. 4 and 8, the split collar 16 is also made in two sections 16' for the same purpose.

Also, the connection ring 32 shown in Figs. 2 and 6 is split to comprise two sections 32' which are fitted about the cap flange 30 and housing flange 31 in assembly and drawn together by tightening nuts, not shown, on the bolts 51 through opposing lugs 52 on each ring section 32'.

The inner diameter 53 of the ball member 34 and the inner diameter 54 of the cap member 26 are sufficiently large to permit the lower end, sub, or tool joint 55 of the kelly to pass therethrough, but the inner diameter 53 of the ball member 34 is smaller than the diameter of the Kelly head 12 so that the tapered Kelly surfaces 56 and 56' rest upon the rim surface 57 of the ball member.

It can happen that the surface 56' may be uneven or irregular as compared with the surface 56. In such a case the ball member 34 can slide to the left, as shown in Fig. 2, thereby permitting the axis of the kelly and of the drill stem 11' connected to the pin 58 of the Kelly tool joint 55 to extend substantially concentrically with the axis of the Kelly drive housing 1 and rotary table 4. This feature of construction avoids any tendency of the kelly to bend as otherwise occurs in other constructions not equipped to compensate for any unevenness, irregularity or eccentricity of the kelly at its point of support on the Kelly drive.

The construction of the pilot tube 18, which comprises the lower portion of housing body 2, provides the leveled base surface 59 and the surface 60 of the outwardly flared base rim 61 to guide the Kelly drive, as the pilot tube 18 passes along the tapered rotary bushing surface 62 and the Kelly drive housing portion or bushing 3 comes to seat on the shoulder 63 and to bear against the side surfaces 64 of the bushing 3' of the rotary table 4.

The pilot tube 18 thus constitutes a protective extension of the Kelly drive housing and provides the seating surface 17 for the split collar 16 against which bears the spring 19. When the kelly is elevated, the Kelly tool joint 55 contacts the split collar 16, and not the Kelly drive bushing 3 or the lower wiper 22, as it might contact corresponding elements in other constructions, and with damaging consequences. Also, the spring 19 buffs the lifting impact of the Kelly tool joint and is compressed until the Kelly drive housing portion or bushing 3 can be lifted from the bushing 3' of the rotary table 4.

As the kelly moves downwardly as drilling progresses, and is rotated by the rotary table via the Kelly drive, the distribution over a large area of the driving and sliding surface contact between Kelly drive and kelly minimizes wear at any one point. Also, since the kelly is borne against heaviest by that part of the roller surface 47 in the direction of lead or rotation, the fact that the rollers 40 can rotate in, and do rotate in the bushing 42 as a result of the torque thus created, results in the exposure of a continually changing portion of the roller face 47 to the driven Kelly surface so that wear is evenly distributed over the roller faces. The fact that the block or roller support assembly 25 provides the space 65 to contain oil to afford a lubricant bath for the contacting and rotating surfaces also minimizes wear.

The kellys employed must have polyhedral surfaces and not be cylindrical in order that driving engagement may be established between Kelly drive and kelly. In Figs. 3 and 4 a square kelly is shown while in Figs. 7 and 8 a hexagonal kelly is shown. The height of roller support assembly or block 25, the number of sides to the kelly, and the diameter of the roller faces 47 are variables through which the portion of Kelly surface which is in driven contact with the roller may be determined for varying field requirements. In this regard, it should be noted that the faces 47 in Fig. 7 are shown of such diameters that only part of their surfaces are in driving contact with the kelly.

Broadly this invention considers an improved Kelly drive equipped to present, in an oil bath, a large and varying roller driving contact surface area to the kelly; an improved Kelly drive equipped to protect the Kelly drive bushing and lower wiper from impact with the Kelly tool joint and to resiliently dampen such impact; and an improved Kelly drive adapted to support a kelly with axis substantially concentric with the axis of the Kelly drive housing and rotary table whereas the portion of the kelly in supported contact with the Kelly drive might be uneven, irregular, or eccentric with relation to such axis.

What is claimed is:

1. A Kelly drive comprising, a housing having a portion of polyhedral outer cross-section to fit into a bushing of polyhedral inner cross-section, said bushing fitting in, and being rotatable with, the rotary table of the rotary machine employed in the rotary method of drilling wells, a segmental ball and socket joint in the top of said housing, a hole axially through said segmental ball member to permit the passage therethrough of the body of the kelly while receiving the head of the kelly to be supported by the top rim surface of said segmental ball member surrounding said hole, a hold down ring in the top of said housing spaced above said segmental ball member and of a smaller inner diameter than the outer diameter of said segmental ball member, roller means mounted in said housing and adapted to provide flat, rotatable, circular contact surfaces against the sides of said kelly, a shoulder in said housing and a split collar supported on said shoulder and of a larger diameter than the tool joint of said kelly, a second hold down ring in said housing and spaced above said shoulder, and a spring around said kelly and confined between said second hold down ring and said split collar and adapted to be compressed when said Kelly tool joint may be lifted upwardly against said split collar.

2. A Kelly drive comprising, a housing having a portion of polyhedral outer cross-section to fit into a bushing of polyhedral inner cross-section, said bushing fitting in, and being rotatable with, the rotary table of the rotary machine employed in the rotary method of drilling wells, said housing having an inner portion of polyhedral cross-section, a downwardly facing shoulder thereabove, and an upwardly facing shoulder therebelow, a seal member supported by said lower shoulder and a seal member thereabove to bear against said upper shoulder, said seal members being adapted to receive said kelly therethrough in sealing contact, a roller support assembly of outer polyhedral cross-section supported in said bushing to bear against said inner polyhedral cross-section portion between said seals and extending around said kelly, bearing means in said support assembly with axes extending radially of the axis of said kelly, and rollers providing flat, rotatable, circular surfaces to bear upon the faces of said kelly and having shafts rotatably received in said bearing means.

3. A Kelly drive comprising, a housing having a portion of polyhedral outer cross-section to fit into a bushing of polyhedral inner cross-section, said bushing fitting in, and being rotatable with, the rotary table of the rotary machine employed in the rotary method of drilling wells, a segmental ball and socket joint in the top of said housing, a hole axially through said segmental ball member to permit the passage therethrough of the body and tool joint of the kelly while receiving the head of the kelly to be supported by the top rim surface of said segmental ball member surrounding said hole, a hold down ring in the top of said housing spaced above said segmental ball member and of a smaller inner diameter than the outer diameter of said segmental ball member, said housing having an inner portion of polyhedral cross-section, a downwardly facing shoulder thereabove, and an upwardly facing shoulder therebelow, a seal member supported by said lower shoulder and a seal member thereabove to bear against said upper shoulder, said seal members being adapted to receive said kelly therethrough in sealing contact, a roller support assembly of outer polyhedral cross-section supported in said bushing to bear against said inner polyhedral cross-section portion between said seals and extending around said kelly, bearing means in said support assembly with axes extending radially of the axis of said kelly, rollers providing flat, rotatable, circular surfaces to bear upon the faces of said kelly and having shafts rotatably received in said bearing means, a bottom shoulder in said housing and a split collar supported on said bottom shoulder and of a larger diameter than the tool joint of said kelly, a second hold down ring in said housing and spaced above said bottom shoulder, and a spring around said kelly and confined between said second hold down ring and said split collar and adapted to be compressed when said Kelly tool joint may be lifted upwardly against said split collar.

4. A Kelly drive comprising, a housing having a portion of polyhedral outer cross-section to fit into a bushing of polyhedral inner cross-section, said bushing fitting in, and being rotatable with, the rotary table of the rotary machine employed in the rotary method of drilling wells, a segmental ball and socket joint in the top of said housing, a hole axially through said segmental ball member to permit the passage therethrough of the body and tool joint of the kelly while receiving the head of the kelly to be supported by the top rim surface of said segmental ball member surrounding said hole, a hold down ring in the top of said housing spaced above said segmental ball member and of a smaller inner diameter than the outer diameter of said segmental ball member, said housing having an inner portion of polyhedral cross-section, a downwardly facing shoulder thereabove, and an upwardly facing shoulder therebelow, a seal member supported by said lower shoulder and a seal member thereabove to bear against said upper shoulder, said seal members being adapted to receive said kelly therethrough of outer polyhedral cross-section supported in said bushing to bear against sealing contact, a roller support assembly in said inner polyhedral cross-section portion between said seals and extending around said kelly, bearing means in said support assembly with axes extending radially of the axis of said kelly, rollers providing flat, rotatable, circular surfaces to bear upon the faces of said kelly and having shafts rotatably received in said bearing means, resilient means mounted to be compressed within said housing below said rollers, and collar means within said housing below said resilient means adapted to receive the impact of said Kelly tool joint when said kelly is lifted.

5. A Kelly drive comprising, a housing having a portion of polyhedral outer cross-section to fit into a bushing of polyhedral inner cross-section, said bushing fitting in, and being rotatable with, the rotary table of the rotary machine employed in the rotary method of drilling wells, means in the top of said housing adapted to permit the downward passage of a Kelly tool joint therethrough and to support an eccentric tapered head portion of a kelly so that the axis of the kelly extends substantially concentric with the axis of the kelly drive housing and rotary machine, said housing having an inner portion of polyhedral cross-section, a downwardly facing shoulder thereabove, and an upwardly facing shoulder therebelow, a seal member supported by said lower shoulder and a seal member thereabove to bear against said upper shoulder, said seal members being adapted to receive said kelly therethrough in sealing contact, a roller support assembly of outer polyhedral cross-section supported in said bushing to bear against said inner polyhedral cross-section portion between said seals and extending around said kelly, bearing means in said support assembly with axes extending radially of the axis of said kelly, rollers providing flat, rotatable, circular surfaces to bear upon the faces of said kelly and having shafts rotatably received in said bearing means, a bottom shoulder in said housing and a split collar supported on said bottom shoulder and of a larger diameter than the tool joint of said kelly, a second hold down ring in said housing and spaced above said bottom shoulder, and a spring around said kelly and confined between said second hold down ring and said split collar and adapted to be compressed when said Kelly tool joint may be lifted upwardly against said split collar.

6. A Kelly drive comprising, a housing having a portion of polyhedral outer cross-section to fit into a bushing of polyhedral inner cross-section, said bushing fitting in, and being rotatable with, the rotary table of the rotary machine employed in the rotary method of drilling wells, a segmental ball and socket joint in the top of said housing, a hole axially through said segmental ball member to permit the passage therethrough of the body of the kelly and Kelly tool joint while receiving the head of the kelly to be supported by the top rim surface of said segmental ball member surrounding said hole, a hold down ring in the top of said housing spaced above said segmental ball member and of a smaller inner diameter than the outer diameter of said segmental ball member, said housing having an inner portion of polyhedral cross-section, support means of outer polyhedral cross-section supported therein to bear against said inner cross-section polyhedral portion, roller means mounted for rotation in said support means and adapted to provide flat, rotatable, circular contact surfaces against the sides of said kelly, resilient means mounted to be compressed within said housing below said rollers, and collar means within said housing below said resilient means adapted to receive the impact of said Kelly tool joint when said kelly is lifted.

7. A Kelly drive comprising, a housing having a portion of polyhedral outer cross-section to fit into a bushing of polyhedral inner cross-section, said bushing fitting in, and being rotatable with, the rotary table of the rotary machine employed in the rotary method of drilling wells, a downwardly facing shoulder thereabove, and an upwardly facing shoulder therebelow, a seal member supported by said lower shoulder and a seal member thereabove to bear against said upper shoulder, said seal members being adapted to receive said kelly therethrough in sealing contact, a roller support assembly in said inner portion between said seals and around said kelly, bearing means in said support assembly with axes extending radially of the axis of said kelly, rollers providing flat, rotatable, circular surfaces to bear upon the faces of said kelly and having shafts rotatably received in said bearing means, resilient means mounted to be compressed within said housing below said rollers, and collar means within said housing below said resilient means adapted to receive the impact of said Kelly tool joint when said kelly is lifted.

8. A Kelly drive comprising, a housing having a portion of polyhedral outer cross-section to fit into a bushing of polyhedral inner cross-section, said bushing fitting in, and being rotatable with, the rotary table of the rotary machine employed in the rotary method of drilling wells, means in the top of said housing adapted to permit the downward passage of a Kelly tool joint therethrough and to support an eccentric tapered head portion of a kelly so that the axis of the kelly extends substantially concentric with the axis of the Kelly drive housing and rotary machine, roller means mounted in said housing and adapted to provide flat, rotatable, circular contact surfaces against the sides of said kelly, a shoulder in said housing and a split collar supported on said shoulder and of a larger diameter than the tool joint of said kelly, a second hold down ring in said housing and spaced above said bottom shoulder, and a spring around said kelly and confined between said second hold down ring and said split collar and adapted to be compressed when said Kelly tool joint may be lifted upwardly against said split collar.

9. A Kelly drive comprising, a housing having a portion of polyhedral outer cross-section to fit into a bushing of polyhedral inner cross-section, said bushing fitting in, and being rotatable with, the rotary table of the rotary machine employed in the rotary method of drilling wells, a segmental ball and socket joint in the top of said housing adapted to permit the downward passage of a Kelly tool joint therethrough and to support an eccentric tapered head portion of a kelly so that the axis of the kelly extends substantially concentric with the axis of the Kelly drive housing and rotary machine, roller means mounted in said housing and adapted to provide flat, rotatable, circular contact surfaces against the sides of said kelly, resilient means mounted to be compressed within said housing below said rollers, and collar means within said housing below said resilient means adapted to receive the impact of said Kelly tool joint when said kelly is lifted.

10. A Kelly drive comprising, a housing having a portion of polyhedral outer cross-section to fit into a bushing of polyhedral inner cross-section, said bushing fitting in, and being rotatable with, the rotary table of the rotary machine employed in the rotary method of drilling wells, a segmental ball and socket joint in the top of said housing, a hole axially through said segmental ball member to permit the passage therethrough of the body of the kelly and Kelly tool joint while receiving the head of the kelly to be supported by the top rim surface of said segmental ball member surrounding said hole, a hold down ring in the top of said housing spaced above said segmental ball member and of a smaller inner diameter than the outer diameter of said segmental ball member, said housing having an inner portion of polyhedral cross-section, a downwardly facing shoulder thereabove, and an upwardly facing shoulder therebelow, a seal member supported by said lower shoulder and a seal member thereabove to bear against said upper shoulder, said seal members being adapted to receive said kelly therethrough in sealing contact, a roller support assembly of outer polyhedral cross-section supported in said bushing to bear against; said inner polyhedral cross-section portion between said seals and extending around said kelly, bearing means in said support assembly with axes extending radially of the axis of said kelly, and rollers providing flat, rotatable, circular surfaces to bear upon the faces of said kelly and having shafts rotatably received in said bearing means.

11. A Kelly drive comprising, a housing having a portion of polyhedral outer cross-section to fit into a bushing of polyhedral inner cross-section, said bushing fitting in, and being rotatable with, the rotary table of the rotary machine employed in the rotary method of drilling wells, a segmental ball and socket joint in the top of said housing, a hole axially through said segmental ball member to permit the passage therethrough of the body of the kelly and Kelly tool joint while receiving the head of the kelly to be supported by the top rim surface of said segmental ball member surrounding said hole, a hold down ring in the top of said housing spaced above said segmental ball member and of a smaller inner diameter than the outer diameter of said segmental ball member, said housing having an inner portion of polyhedral cross-section, support means of outer polyhedral cross-section supported therein to bear against said inner polyhedral cross-section portion and adapted to establish a driving connection between said housing and said kelly, a shoulder in said housing and a split collar supported on said shoulder and of a larger diameter than the tool joint of said kelly, a second hold down ring in said housing and spaced above said bottom shoulder, and a spring around said kelly and confined between said second hold down ring and said split collar and adapted to be compressed when said Kelly tool joint may be lifted upwardly against said split collar.

12. A Kelly drive comprising, a housing having a portion of polyhedral outer cross-section to fit into a bushing of polyhedral inner cross-section, said bushing fitting in, and being rotatable with, the rotary table of the rotary machine employed in the rotary method of drilling wells, a downwardly facing shoulder thereabove, and an upwardly facing shoulder therebelow, a seal member supported by said lower shoulder and a seal member thereabove to bear against said upper shoulder, said seal members being adapted to receive said kelly therethrough in sealing contact, a roller support assembly in said inner portion between said seals and around said kelly, bearing means in said support assembly with axes extending radially of the axis of said kelly, rollers providing flat, rotatable, circular surfaces to bear upon the faces of said kelly and having shafts rotatably received in said bearing means, a bottom shoulder in said housing and a split bottom shoulder supported on said collar and of a larger diameter than the tool joint of said kelly, a second hold down ring in said housing and spaced above said bottom shoulder, and a spring around said kelly and confined between said second hold down ring and said split collar and adapted to be compressed when said Kelly tool joint may be lifted upward against said split collar.

13. A Kelly drive comprising, a housing having a portion of polyhedral outer cross-section to fit into a bushing of polyhedral inner cross-section, said bushing fitting in, and being rotatable with, the rotary table of the rotary machine employed in the rotary method of drilling wells, a shoulder in said housing and a split collar supported on said shoulder and of a larger diameter than the tool joint of said kelly, a second hold down ring in said housing and spaced above said shoulder, and a spring around said kelly and confined between said second hold down ring and said split collar and adapted to be compressed when said Kelly tool joint may be lifted upwardly against said split collar, and means between said housing and said kelly to establish a driving connection thereinbetween.

14. A Kelly drive comprising, a housing having a portion of polyhedral outer cross-section to fit into a bushing of polyhedral inner cross-section, said bushing fitting in, and being rotatable with, the rotary table of the rotary machine employed in the rotary method of drilling wells, means in the top of said housing adapted to permit the downward passage of a Kelly tool joint therethrough and to support an eccentric tapered head portion of a kelly so that the axis of the kelly extends substantially concentric with the axis of the Kelly drive housing and rotary machine, rotation transmission means between said housing and said kelly to establish a driving connection thereinbetween, resilient means mounted to be compressed within said housing below said rotation transmission means, and collar means within said housing below said resilient means adapted to receive the impact of said Kelly tool joint when said kelly is lifted.

15. A Kelly drive comprising, a housing having a portion of polyhedral outer cross-section to fit into a bushing of polyhedral inner cross-section, said bushing fitting in, and being rotatable with, the rotary table of the rotary machine employed in the rotary method of drilling wells, roller means mounted in said housing and adapted to provide flat, rotatable, circular contact surfaces against the sides of said kelly, resilient means mounted to be compressed within said housing below said rollers, and collar means within said housing below said resilient means and in contact therewith adapted to receive the impact of said Kelly tool joint when said kelly is lifted and to transmit such impact to said resilient means.

16. A Kelly drive comprising, a housing having a portion of polyhedral outer cross-section to fit into a bushing of polyhedral inner cross-section, said bushing fitting in, and being rotatable with the rotary table of the rotary machine employed in the rotary method of drilling wells, means in the top of said housing adapted to permit the downward passage of a Kelly tool joint therethrough and to support an eccentric tapered head portion of a kelly so that the axis of the kelly extends substantially concentric with the axis of the Kelly drive housing and rotary machine, a downwardly facing shoulder thereabove, and an upwardly facing shoulder therebelow, a seal member supported by said lower shoulder and a seal member thereabove to bear against said upper shoulder, said seal members being adapted to receive said kelly therethrough in sealing contact, a roller support assembly in said inner portion between said seals and around said kelly, bearing means in said support assembly with axes extending radially of the axis of said kelly, and rollers providing flat, rotatable, circular surfaces to bear upon the faces of said kelly and having shafts rotatably received in said bearing means.

17. A Kelly drive comprising, a housing having a portion of polyhedral outer cross-section to fit into a bushing of polyhedral inner cross-section, said bushing fitting in, and being rotatable with, the rotary table of the rotary machine employed in the rotary method of drilling wells, means in the top of said housing adapted to permit the downward passage of a Kelly tool joint therethrough and to support an eccentric tapered head portion of a kelly so that the axis of the kelly extends substantially concentric with the axis of the Kelly drive housing and rotary machine, rotation transmission means between said housing and said kelly to establish a driving connection thereinbetween, a shoulder in said housing and a split collar supported on said shoulder and of a larger diameter than the tool joint of said kelly, a second hold down ring in said housing and spaced above said shoulder, and a spring around said kelly and confined between said second hold down ring and said split collar and adapted to be compressed when said Kelly tool joint may be lifted upwardly against said split collar.

18. A Kelly drive comprising, a housing having a portion of polyhedral outer cross-section to fit into a bushing of polyhedral inner cross-section, said bushing fitting in, and being rotatable with, the rotary table of the rotary machine employed in the rotary method of drilling wells, a segmental ball and socket joint in the top of said housing, a hole axially through said segmental ball member to permit the passage therethrough of the body of the kelly and Kelly tool joint while receiving the head of the kelly to be supported by the top rim surface of said segmental ball member surrounding said hole, a hold down ring in the top of said housing spaced above said segmental ball member and a smaller inner diameter than the outer diameter of said segmental ball member, said housing having an inner portion of polyhedral cross-section, support means of outer polyhedral cross-section supported therein to bear against said inner polyhedral cross-section portion and adapted to establish a driving connection between said housing and said kelly, a resilient means mounted to be compressed within said housing below said support means, and collar means within said housing below said resilient means adapted to receive the impact of said Kelly tool joint when said kelly is lifted.

19. A Kelly drive comprising, a housing having a portion of polyhedral outer cross-section to fit into a bushing of polyhedral inner cross-section, said bushing fitting in, and being rotatable with, the rotary table of the rotary machine employed in the rotary method of drilling wells, roller means mounted in said housing and adapted to provide flat, rotatable, circular contact surfaces against the sides of said kelly, a shoulder in said housing and a split collar supported on said shoulder and of a lesser diameter than the tool joint of said kelly, a second hold down ring in said housing and spaced above said bottom shoulder, and a spring around said kelly and confined between said second hold down ring and said split collar and adapted to be compressed when said Kelly tool joint may be lifted upwardly against said split collar.

20. A Kelly drive comprising, a housing having a portion of polyhedral outer cross-section to fit into a bushing of polyhedral inner cross-section, said bushing fitting in, and being rotatable with, the rotary table of the rotary machine employed in the rotary method of drilling wells, a downwardly facing shoulder thereabove, and an upwardly facing shoulder therebelow, a seal member supported by said lower shoulder therebelow, and a seal member thereabove to bear against said upper shoulder, said seal members being adapted to receive said kelly therethrough in sealing contact, a roller support assembly in said inner portion between said seals and around said kelly, bearing means in said support assembly with axes extending radially of the axis of said kelly, rollers providing flat, rotatable, circular surfaces to bear upon the faces of said kelly and having shafts rotatably received in said bearing means, resilient means mounted to be compressed within said housing below said rollers, and collar means within said housing below said resilient means adapted to receive the impact of said Kelly tool joint when said kelly is lifted.

21. A Kelly drive comprising, a housing having a portion of polyhedral outer cross-section to fit into a bushing of polyhedral inner cross-section said bushing fitting in, and being rotatable with, the rotary table of the rotary machine employed in the rotary method of drilling wells, means in the top of said housing adapted to permit the downward passage of a Kelly tool joint therethrough and to support an eccentric tapered head portion of a kelly of square cross-section so that the axis of the kelly extends substantially concentric with the axis of the Kelly drive housing and rotary machine, roller means mounted in said housing and adapted to provide flat, rotatable, circular contact surfaces against the sides of said kelly, resilient means mounted to be compressed with in said housing below said rollers, and collar means within said housing below said resilient means and in contact therewith adapted to receive the impact of said Kelly tool joint when said kelly is lifted and to transmit such impact to said resilient means.

22. A Kelly drive comprising, a housing having a portion of polyhedral outer cross-section to fit into a bushing of polyhedral inner cross-section said bushing fitting in, and being rotatable with, the rotary table of the rotary machine employed in the rotary method of drilling wells, means in the top of said housing adapted to permit the downward passage of a Kelly tool joint therethrough and to support an eccentric tapered head portion of a kelly of polyhedral cross-section and having more than four sides so that the axis of the kelly extends substantially concentric with the axis of the Kelly drive housing and rotary machine, roller means mounted in said housing and adapted to provide flat, rotatable, circular contact surfaces against the sides of said kelly, resilient means mounted to be compressed within said housing below said rollers, and collar means within said housing below said resilient means and in contact therewith adapted to receive the impact of said Kelly tool joint when said kelly is lifted and to transmit such impact to said resilient means.

23. In a drive for well drilling equipment, a rotary table and a kelly slidably projecting through the table to be rotated therewith and having a terminal head of larger cross-section than the Kelly portion therebelow, a driver sleeve for the kelly carried by the table and provided at its top with a parti-spherical seat, a segmental ball member having a parti-spherical seat mating with and shiftable on said first mentioned seat, said segmental ball member having an interior diameter considerably larger than the width of the kelly below said terminal head for accommodating relative lateral motion and of smaller diameter than the cross-section of said head for abutment by said head at the lower limit of Kelly travel and to permit said head and said segmental ball member to shift position on said drive sleeve parti-spherical seat to accommodate irregular contact surfaces on the head which are out of symmetry in relation to the axis of said kelly.

24. In a drive for drilling equipment, a rotary table having a bushing therein of polyhedral inner cross-section to fit within and rotate with said rotary table, a kelly having a terminal head of greater cross-sectional area than the portion thereof therebelow which is slidably projectible through said table to be rotated therewith, a Kelly drive comprising a housing having a portion of polyhedral outer cross-section to fit within said bushing, said housing being provided at its top with a partispherical seat, a segmental ball member having a parti-spherical seat mating with and shiftable on said first mentioned seat, said segmental ball member having an interior diameter considerably larger than the width of said kelly below said terminal head for accommodating relative lateral motion between said segmental ball member and said Kelly portion as said Kelly portion extends through said segmental ball member, said segmental ball member being of smaller diameter than the cross-sectional area of said terminal head for abutment by said terminal head at the lower limit of Kelly travel and to permit shifting of said terminal head and said segmental ball member position on said housing parti-spherical seat to accommodate irregular contact surfaces on said head which are out of symmetry with relation to the axis of said kelly.

25. A Kelly drive as claimed in claim 23 in which roller means are mounted in said housing and adapted to provide flat, rotatable, circular contact surfaces against the sides of said kelly.

26. In a drive for well drilling equipment, a rotary table and a polygonal kelly slidably projecting through the table to be rotated therewith, a Kelly driver sleeve carried by the table, and one or more drive transmitting and thrust receiving members, each freely rotatably mounted on an axis which extends transversely to the Kelly axis and which intersects the adjacent flat driven face of the kelly, said member presenting an end face in a flat plane perpendicular to the member mounting axis and engageable with said flat driven face of the kelly for reducing sliding friction in the rotational drive of the kelly.

27. In a drive for well drilling equipment, a rotary table, a kelly slidably projecting through the table to be rotated therewith, a driver sleeve for the slidable kelly carried by the table, a formation on the kelly below said driver sleeve of a shape to preclude passage through the sleeve and thereby constitute a limit stop to upward Kelly travel, and a resilient buffer carried by the driver sleeve for cushioning engagement by said limit stop formation.

References Cited in the file of this patent

UNITED STATES PATENTS

| | | |
|---|---|---|
| 1,544,883 | Boykin, Jr. | July 7, 1925 |
| 2,023,796 | Sorensen et al. | Dec. 10, 1935 |
| 2,527,087 | Vock | Oct. 24, 1950 |
| 2,559,100 | White | July 3, 1951 |

FOREIGN PATENTS

| | | |
|---|---|---|
| 620,446 | Germany | Oct. 21, 1935 |